Sept. 6, 1932.  E. T. WUEST  1,876,194
MACHINE FOR THE MANUFACTURE OF BATS
Filed Nov. 14, 1930   3 Sheets-Sheet 2

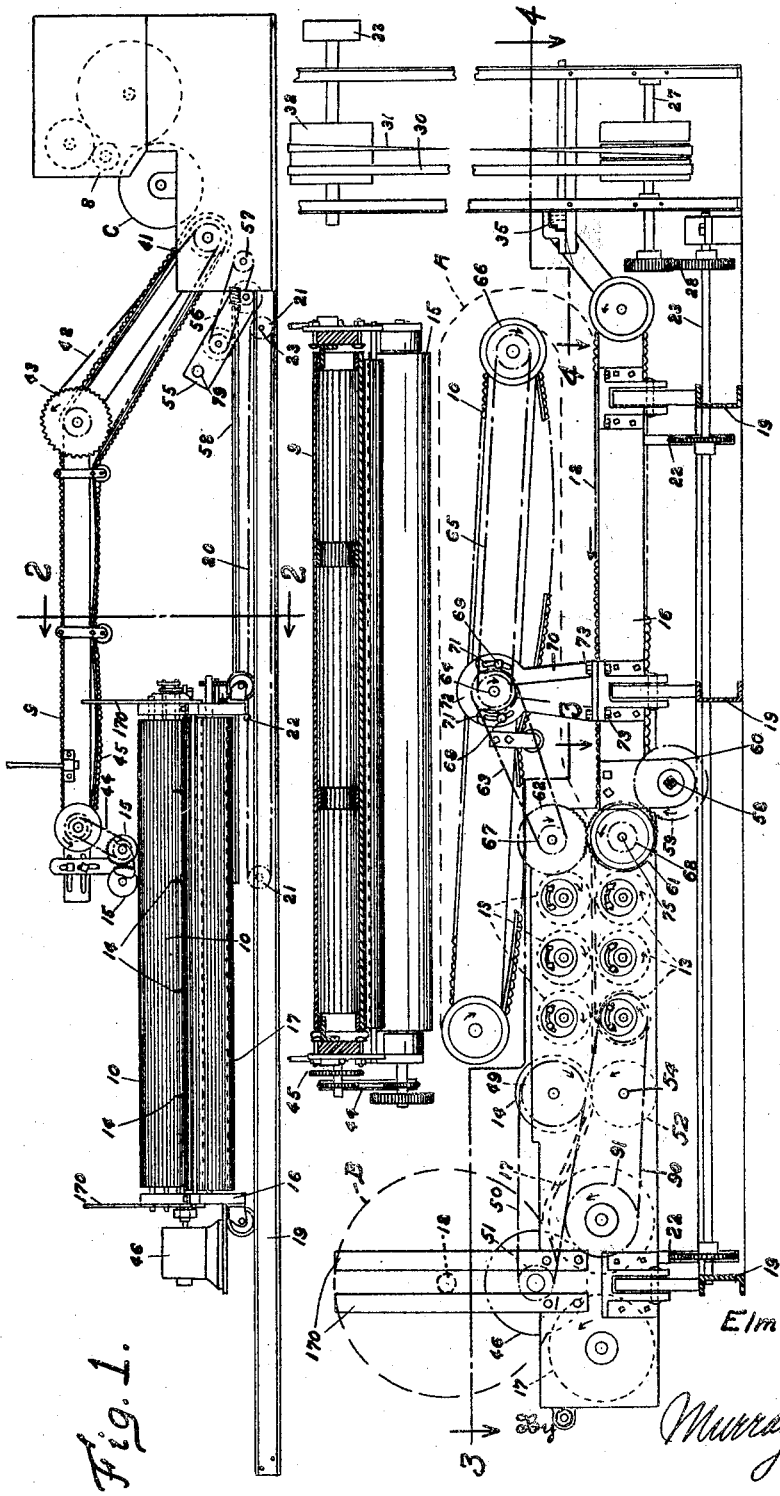

Inventor
Elmer T. Wuest

Sept. 6, 1932.  E. T. WUEST  1,876,194
MACHINE FOR THE MANUFACTURE OF BATS
Filed Nov. 14, 1930  3 Sheets-Sheet 3
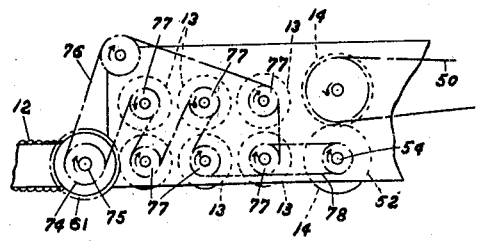
Fig. 5.
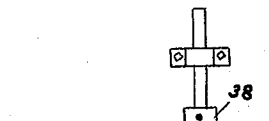
Fig. 4.
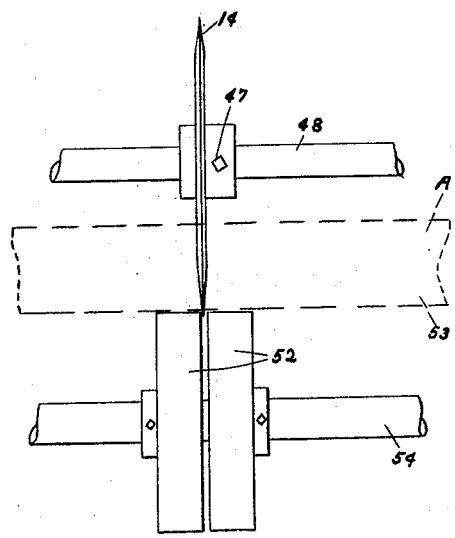
Fig. 6.
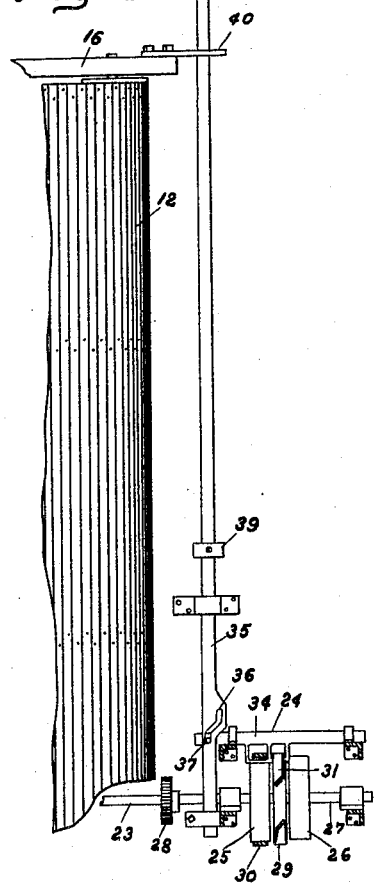
Inventor
Elmer T. Wuest
By Murray and Rugelter
Attorneys Patented Sept. 6, 1932

1,876,194

UNITED STATES PATENT OFFICE

ELMER T. WUEST, OF CINCINNATI, OHIO, ASSIGNOR TO ADAM WUEST, INC., A CORPORATION OF OHIO

MACHINE FOR THE MANUFACTURE OF BATS

Application filed November 14, 1930. Serial No. 495,605.

This invention relates to a device for use in the manufacture of felt, batting, or the like.

An object of the invention is to provide in a single, compact, rapidly operative batt or felt manufacturing machine, means for preparing the material and arranging it in sheet form, lapping the sheeted material, compressing the lapped sheet and finally cutting it to provide strips of a given width.

Another object of the invention is to provide simple means in a device of the above character, whereby the device may be adjusted for producing felt or batting in sheet form, either compressed or loose as desired.

A further object is to provide an efficient and rapidly operating device of the above type wherein is provided a traveling lapper having in association therewith compression rolls and cutters, which are ingeniously arranged for bodily movement with the traveling lapper.

Another object is to arrange the elements of a machine of the above type so as to effect a substantial reduction in the floor space necessary for installation.

These and other objects are attained by the means described herein and disclosed in the accompanying drawings, in which:

Fig. 1 is a side elevational view of the machine of the invention.

Fig. 2 is a cross-sectional view taken on line 2—2 of Fig. 1.

Fig. 4 is a cross-sectional view taken on line 4—4 of Fig. 2.

Fig. 5 is a fragmental view showing diagrammatically the means for actuating the compression rolls, cutters, and batt discharging apron.

Fig. 6 is an elevational view of a cutter mechanism forming a detail of the invention.

Figure 3:
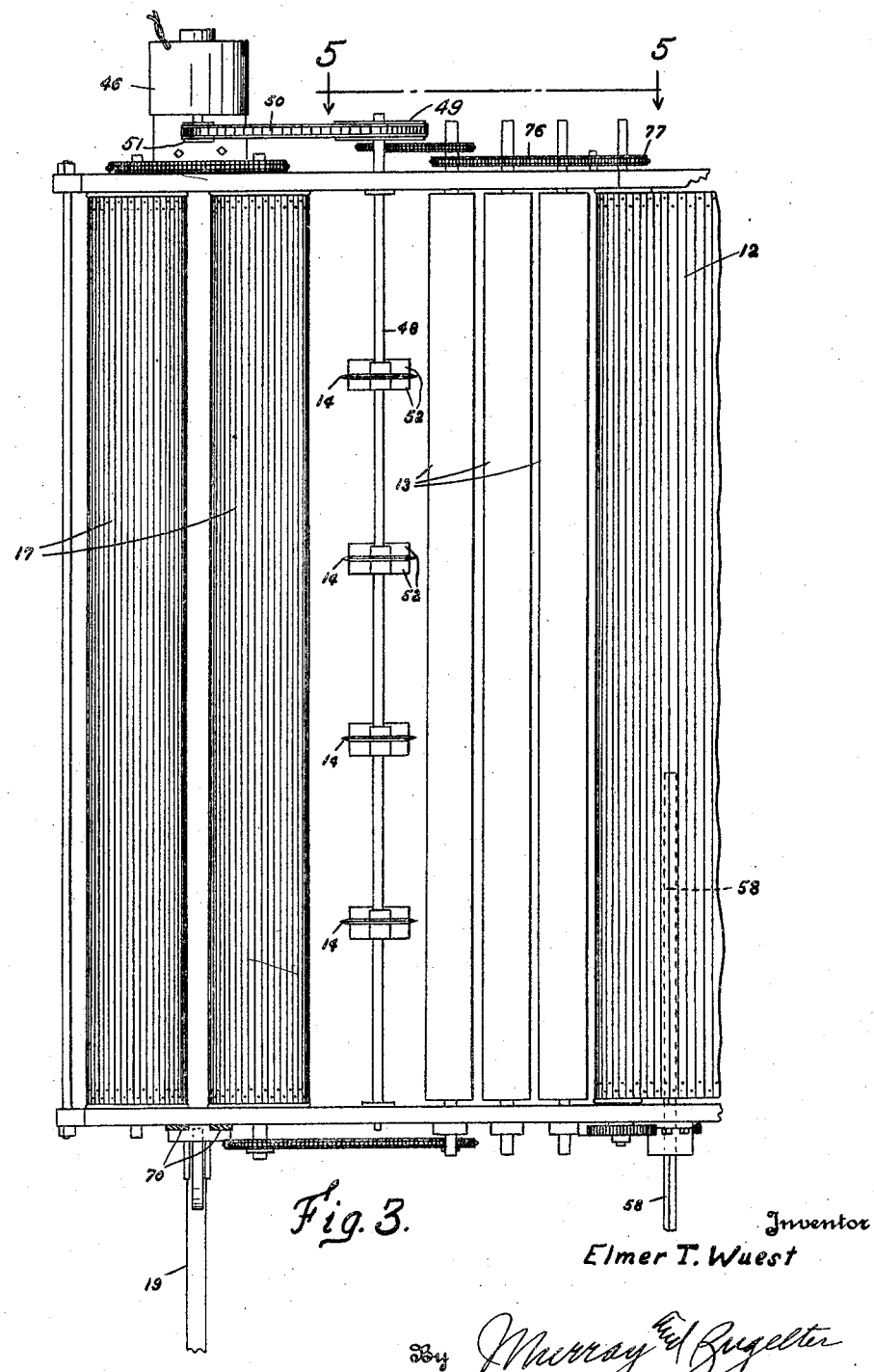
Fig. 3 is a top plan view taken on line 3—3 of Fig. 2.

In general, the machine of the present invention comprises a preparer 8, an elevated conveyor or traveling apron 9 for receiving the prepared cotton or other material from the preparer, and a reciprocating carriage movable longitudinally in a plane below the apron 9 and having associated therewith transversely moving conveyors or aprons 10 and 12 which provide, respectively, a traveling lapper or folding device, and means for feeding the folded material to a series of compression rolls 13 and cutters 14, which rolls and cutters are mounted upon the reciprocating carriage.

Material discharged by the preparer onto the elevated conveyor or traveling apron 9, is carried forwardly thereby to a pair of parallel driven rollers 15, whence the prepared material in sheet form, is directed downwardly upon the traveling apron 10, which may be termed a traveling lapper element. The discharge of sheet material from the rollers 15 is continuous, and during such discharging operation, the entire carriage 16 is reciprocated longitudinally below the elevated conveyor for the purpose of lapping or folding the material upon itself, whereby to form a comparatively thick cushion-like batt. The batt thus formed is discharged from the traveling apron 10 as a continuous length of soft cushion material, for the reason that the lapper element or apron 10 is constantly driven in a direction transversely of the line of movement of the carriage. As is most clearly shown in Fig. 2, the continuous strip A of batting is discharged onto the oppositely moving traveling apron 12, referred to hereafter as the discharging apron. This apron 12 conveys the sheet material to the series of compression rollers 13, which in turn feed the material through the cutting elements 14. Upon leaving the compression rolls and cutting elements, the material is formed into a roll B, which roll rests upon a pair of supporting rolls 17 which are power driven at a proper speed to preclude stretching of the material during formation thereof into rolls. One of the rolls 17 may be driven by means of a chain 90 which transmits power from the shaft of one of the compression rolls. Said chain may pass over a sprocket 91 which is fixed for rotation with the supporting roll 17. It will be noted that there is provided a central shaft 18 upon which the rolling of the material is begun.

Bodily reciprocation of the carriage 16 upon the parallel tracks 19 is effected by means of a pair of endless chains or the like 20, each of which passes over a pair of spaced sprockets 21 supported by the track members for rotational movement. At points 22, the chains are secured to the body of the carriage. The sprockets 21 which are nearest the preparer, are fixed upon a reversing shaft 23 which is rotated a predetermined number of revolutions, first in one direction, then in the other direction, by means of the mechanism indicated at 24. This character of rotation of the shaft 23 serves to reciprocate the carriage 16 bodily beneath the elevated apron or conveyer 9.

The reversing mechanism 24 comprises a pair of pulleys 25 and 26 tight on a shaft 27, which is geared at 28 to the reverse shaft 23, intermediate which pulleys is an idler 29. Associated with the pulleys is a straight belt 30 and a crossed belt 31, both of which pass over a common drive pulley 32 to which is applied power from the motor or power pulley 33. By shifting the belts laterally of the pulleys 25, 26 and 29, opposite directions of rotation are imparted to the shafts 27 and 23. At 34 is indicated a belt shifter actuated by means of a longitudinal shift bar 35 having a cam portion 36 for cooperation with a pin 37 on the belt shifter. The shifting bar is provided with adjustable collars or stops 38 and 39, which are adapted to be struck by an extension or actuating member 40 carried by the reciprocating carriage. From the foregoing it should be apparent that movement of the carriage along its tracks in one direction, will cause the extension 40 to strike collar 39, whereby, as indicated in Fig. 4, the belt shifter 34 will move for disposing the crossed belt 31 in driving relation with the tight pulley 26.

The elevated conveyer or traveling apron 9 may be continuously moved by power taken from the preparer 8. For this purpose there is provided a drive sprocket 41 on the preparer, which drives a chain 42 passing over a sprocket 43. The continuously operating rolls 15 are geared together for rotation in opposite directions, one of said rolls being driven by means of sprockets and the chains 44 and 45.

Before going into detail as to the means provided for actuating the aprons 10 and 12, and the compression rolls 13, attention is directed to the fact that the upper cutter element 14 comprises a rotary knife (Fig. 6) which is driven independently of the apron driving means, for example, by means of a high speed motor 46. Set screws 47 are provided on the rotary cutters, whereby the cutters may be adjusted longitudinally of the cutter shaft 48. Said cutter shaft has fixed thereon a sprocket 49 over which passes a chain 50 engaging the motor shaft sprocket 51. Each rotary cutter cooperates with a suitable batt support comprising a pair of spaced pulleys 52 upon which the batt 53 may rest while undergoing the cutting operation. The cutter blade is arranged for disposition in the space between the pulley members 52, as indicated in Fig. 6. These pulleys also are adjustable, with the cutter, longitudinally of a driven shaft 54 upon which they are normally fixed.

As explained before, the carriage 16 has longitudinal reciprocatory movement along the rails 19, while the individual endless conveyers or aprons 10 and 12 have movement, in opposite directions, transversely of the carriage. The means for actuating the conveyers 10 and 12 are as follows. Adjacent the preparer 8 is located a suitable variable speed mechanism 55 driven by means of sprockets and the chain 56, from a rotating shaft 57 of the preparer. The variable speed device 55 is not novel, and such devices may be procured on the market, wherefore a detailed description thereof is considered unnecessary, suffice it to say that said variable speed device is adapted to rotate a square or angular shaft 58, which shaft extends longitudinally of and in parallelism with the rails 19. Arranged for sliding movement along the shaft 58 is a gear 59 having a central opening therein of a size and shape to snuggly receive the angular shaft 58, whereby said gear will rotate with the angular shaft while sliding longitudinally thereof. Gear 59 has such a relationship with a depending support 60 as to insure movement of the gear with the carriage and intermeshing of its teeth with the teeth of an idler gear 61. Idler gear 61 meshes with a gear 62, which, by means of a chain and sprocket element 63, rotates the drive shaft 64 of apron 10. Chain and sprocket means 65 provide for rotation of the apron supporting roller 66, whereby continuous movement is imparted to the traveling apron 10. It will readily be understood that the sprockets 67 and 68, which are fixed relative to the gears 62 and 61, respectively, may be utilized for moving the apron 10 in the opposite direction.

For example, when it is desired to change the direction of movement of apron 10, the chain 63 may be removed from sprocket 67, and a longer chain provided for cooperation with sprocket 68 instead of sprocket 67. The apron 10 thereupon has its direction of movement reversed. This feature of the device is utilized when it is desired to roll the material after it is discharged from the apron 10, the compressing and cutting operations being dispensed with. When uncut and unpressed batts are desired, the bolts 69 are loosened, whereupon the entire traveling apron 10 may be tilted in a direction opposite to that indicated in Fig. 2. Discharge and formation of rolled batting thereby immediately follow the lapping or folding operation. Batting in the loose uncut condition is desirable for use in soft mattresses and the like. From the foregoing, it will be apparent that the machine may be adjusted to manufacture loose uncut batting sheets, as well as compressed sheets cut to any desired width.

The tiltable traveling apron mechanism 10 is supported intermediate the aprons 9 and 12 by means of a pair of aligned spaced brackets 70, each of which is provided with an arcuate slot 71 for reception of the bolts 69, which bolts have threaded engagement with a plate 72 mounted for tilting movement with the traveling apron frame. The brackets 70 may be bolted or otherwise secured onto the reciprocating carriage 16, as indicated at 73. The rotatable shaft 64 may provide a support about which the tiltable conveyer 10 may be moved.

In Fig. 5 is clearly shown the means for imparting rotation to all of the compression rollers and the pulleys 52 which cooperate with the rotary cutter. Said means comprises a sprocket 74 fixed onto the shaft 75 of gear 61, over which sprocket passes a chain 76. This chain engages a series of sprockets 77, one each of which is fixed for rotation with the compression rollers 13. The shaft 54 upon which are mounted the spaced pulleys 52, is driven by means of a chain and sprocket element 78 driven by the shaft of one of the compression rolls. From the foregoing, it should be readily apparent that the speed of rotation of the compression rolls, the pulleys 52, conveyer 12, and conveyer 10, are controlled by the variable speed mechanism 55 which drives the angular shaft 58. By varying the speed of the aforesaid elements, batts of varying thicknesses may be produced. At 79, Fig. 1, is shown a manually operative means for adjusting the variable speed mechanism to drive the angular shaft 58 at a desired rate of speed. The rate of movement of the elevated apron 9 preferably is constant. The upright members 170 (Figs. 1 and 2) are provided for the purpose of guiding the shaft 18 as the finished material is wound thereon.

The operation of the device is as follows: upon starting the motor C, the preparer is operated and begins to deposit a web or sheet of cotton or like material upon the inclined portion of the elevated traveling apron 9, which conveyer is driven by means of the sprocket 41. At the same time, power is transmitted to the angular shaft 58, through the variable speed mechanism 55 and shaft 57 of the preparer. Rotation of shaft 58 serves to drive the traveling aprons 10 and 12, compression rolls 13, and the pulleys 52 forming part of the cutter structure. The speed of movement of these parts is controlled by actuating the hand wheel 79 on the variable speed device 55. The rotary cutters 14 are actuated by closing a switch to the motor 46. Obviously, this motor may be in electrical connection with the motor of the preparer, so that both motors may be energized by the closing of a single electrical switch.

As the thin sheet of batting, formed by the preparer, moves forwardly upon the elevated conveyer 9, it drops between the rolls 15 and is deposited upon the slowly moving tiltable traveling apron 10, which apron not only moves laterally of the machine, but is reciprocated with the entire carriage 16. Rapid reciprocation of the carriage and comparatively slow movement of the apron 10 effects the formation of a soft batt consisting of numerous layers of material discharged from the elevated apron. The comparatively thick batt that is thereby formed drops down onto the discharging apron 12, as indicated at A, Fig. 2. Movement of the discharge conveyer 12 carries the continuous batt to the compression rollers 13, which in turn subject the batt to the cutting operation at 14. After having been cut into desired widths by the rotary cutters 14, the strips of compressed batting are wound upon the shaft 18, which is guided between uprights 170 as the roll increases in diameter. The rolls of compressed batting rest upon the driven rollers 17, which serve to wind the material upon the shaft 18. It is to be noted that during the operation of the device, the entire carriage 16 is reciprocated, the finished material, the cutters and the compression rolls moving therewith. Reciprocation of the carriage is effected by means of the continuous chains 20 to which the carriage is secured at 22. The shaft 23 to which the sprockets 21 for chains 20 are secured, has imparted thereto rotational movement in opposite directions by means of the belt shifting mechanism 24 (Fig. 4). Upon reaching its one limit of movement, the extension 40 of the carriage strikes collar 39 on the shift bar 35, thereby shifting the belts to effect reverse rotation of carriage drive shaft 23. As the carriage reaches its other limit of movement, the extension 40 strikes the collar 38 for returning the belt shifting mechanism to the first position, whereupon movement of the carriage along the rails 19 is reversed.

When it is desired to manufacture soft, uncut batts, that is, batts not operated upon by the compression rollers and cutters, the bolts 69 are loosened to permit tilting of the traveling apron 10 downwardly in the direction of the supporting rolls 17, and the chain 63 is removed from sprocket 67 and replaced by a chain engaging the sprocket 68, which latter rotates in a direction opposite to that of sprocket 67. The direction of movement of apron 10 thereby is reversed, and material piled thereon in batt form by the action of the aprons 9 and 10 and the reciprocating carriage, is discharged directly upon the power actuated supporting rolls 17 and wound upon the shaft 18, if desired. The thickness of the batting is controlled by varying the speed of rotation of the angular shaft 58 by means of the control lever 79 on the speed changing device 55.

It is to be understood that various modifications and changes in structural details of the device may be made, within the scope of the claims, without departing from the spirit of the invention.

What is claimed is:

1. In a device for the manufacture of batts, the combination of an elevated traveling apron for advancing a continuous length of sheet material, a second traveling apron movable in opposite directions transversely of the direction of movement of the first apron, a carriage providing a tilting mounting for the second apron, means for reciprocating the carriage longitudinally of the first apron whereby to provide a sheet folding means, a discharging conveyer, and power actuated means mounted for movement with the carriage and adapted to operate on the folded material carried thereto by the discharging conveyer, tilting of the second traveling apron and reversal of movement thereof serving to discharge the folded material prior to subjection thereof to the power actuated means.

2. In a device for the manufacture of batts, the combination of an elevated traveling apron for advancing a continuous length of sheet material, a second traveling apron movable in opposite directions transversely of the direction of movement of the first apron, a carriage providing a tilting mounting for the second apron, means for reciprocating the carriage longitudinally of the first apron whereby to provide a sheet folding means, a discharging conveyer, power actuated means mounted for movement with the carriage and adapted to operate on the folded material carried thereto by the discharging conveyer, tilting of the second traveling apron and reversal of movement thereof serving to discharge the folded material prior to subjection thereof to the power actuated means, and means traveling with the carriage for rolling the discharged material.

3. In combination a preparer adapted to continuously discharge batting material, an elevated traveling apron for receiving the batting material and advancing it, a pressure means at the end of the apron for compressing the material into continuous sheet form, a second traveling apron movable in opposite directions transversely of the direction of movement of the first apron, a carriage providing a tilting mounting for the second apron, means for reciprocating the carriage longitudinally of the first apron whereby to provide a sheet folding means, a discharging conveyer, and power actuated means mounted for movement with the carriage and adapted to operate on the folded material carried thereto by the discharging conveyer, tilting of the second traveling apron and reversal of movement thereof serving to discharge the folded material prior to subjection thereof to the power actuated means.

4. In a device of the class described the combination of a lapper element, means for compressing, cutting and compiling material carried by the lapper element, and means whereby the lapper element may be adapted to discharge folded material either directly to the compiling means or to the compiling means subsequent to compressing and cutting.

5. In a device of the class described the combination of a lapper element, power actuated means for operating upon and compiling material carried by the lapper element, and means whereby the lapper element may be adapted to selectively discharge folded material either directly to the compiling means or to the means for operating upon the lapped material.

6. In a device of the class described the combination of a lapping means comprising a slowly moved lap supporting apron, power actuating means cooperating for working upon the lap, and means for compiling the lap, a power driven conveying apron disposed below the lap supporting apron and adapted to feed the lap from the first apron to the means for working upon the lap, and a reversing means associated with the first apron for selectively directing the lapped material either directly to the compiling means or to the second apron which feeds the lap to the lap working means.

7. In a device of the class described the combination of a traveling elevated apron for advancing material from a preparer, means for power actuating said apron, a second traveling apron, a carriage upon which the second traveling apron is mounted, means for reciprocating the carriage beneath and longitudinally of the elevated apron whereby to provide a means for folding the material, compression rolls mounted for movement with the carriage for operating upon the folded material, and a common variable speed power means for simultaneously driving the compression rolls and the second traveling apron at constant ratio speeds whereby the thickness and rate of discharge of the folded material may be varied without stretching the folded material.

In testimony whereof, I have hereunto subscribed my name this 7th day of November, 1930.

ELMER T. WUEST.